US006862530B2

(12) United States Patent
Fleury et al.

(10) Patent No.: US 6,862,530 B2
(45) Date of Patent: Mar. 1, 2005

(54) SYSTEM AND METHOD FOR VISUALIZING MULTI-SCALE DATA ALONGSIDE A 3D TRAJECTORY

(75) Inventors: Simon Fleury, Ithaca, NY (US); Igor Terentyev, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/250,049

(22) Filed: May 30, 2003

(65) Prior Publication Data

US 2004/0210392 A1 Oct. 21, 2004

Related U.S. Application Data

(60) Provisional application No. 60/462,276, filed on Apr. 11, 2003.

(51) Int. Cl.[7] .............................................. G06F 19/00
(52) U.S. Cl. ......................................................... 702/9
(58) Field of Search ........................... 702/16, 6, 9, 13; 382/109

(56) References Cited

U.S. PATENT DOCUMENTS

| | | | | | |
|---|---|---|---|---|---|
| 5,917,160 | A | * | 6/1999 | Bailey ........................ | 181/112 |
| 6,021,377 | A | * | 2/2000 | Dubinsky et al. .............. | 702/9 |
| 6,109,368 | A | * | 8/2000 | Goldman et al. ............. | 175/39 |
| 6,282,452 | B1 | * | 8/2001 | DeGuzman et al. .......... | 700/32 |
| 6,315,062 | B1 | * | 11/2001 | Alft et al. ..................... | 175/45 |
| 6,389,360 | B1 | * | 5/2002 | Alft et al. ...................... | 702/9 |
| 2002/0172408 | A1 | | 11/2002 | Saito et al. | |

FOREIGN PATENT DOCUMENTS

| | | |
|---|---|---|
| GB | 2380382 | 4/2003 |
| WO | WO 00/00934 | 1/2000 |
| WO | WO 02/35284 | 5/2002 |

OTHER PUBLICATIONS

Sugano, Tsuyoshi, Basic Concept of Subsurface Solid Array Electrical Prospecting Methods, Geophysical Exploration (Japan), 45, Oct. 1992, pp. 421–435.

Xie, Huchen et al., The Borehole Televiewer Digital Image Analysis and Processing, Acoustic Imaging, vol. 19, Proceedings from the 16th Int. Symposium, 1987, pp. 41–47.

* cited by examiner

*Primary Examiner*—Donald McElheny, Jr.
(74) *Attorney, Agent, or Firm*—Kevin P. McEnaney; Brigitte L. Echols

(57) ABSTRACT

A method for displaying a borehole trajectory includes displaying the borehole trajectory and an indicator of a working interval in a big view window; and displaying a section of the borehole trajectory in a small view window, wherein the section corresponds to the working interval. The method may further includes displaying well log data in a log view window. A system for displaying a borehole trajectory includes a display; and a computer operatively coupled to the display, the computer having a program to display the borehole trajectory on the display, the program comprising instructions to enable: displaying the borehole trajectory and an indicator of a working interval in a big view window; and displaying a section of the borehole trajectory in a small view window, wherein the section corresponds to the working interval.

32 Claims, 8 Drawing Sheets

SYSTEM AND METHOD FOR VISUALIZING MULTI-SCALE DATA ALONGSIDE A 3D TRAJECTORY

CROSS REFERENCE TO RELATED APPLICATIONS

This invention claims priority pursuant to 35 U.S.C. Â§119 of U.S. Provisional Patent Application Ser. No. 60/462,276, filed on Apr. 11, 2003. This Provisional Application is hereby incorporated by reference in its entirety.

BACKGROUND OF INVENTION

The present invention relates to techniques for visualizing multi-scale data on a display.

Determining properties of subsurface earth formation is a critical element in maximizing the profitability of oil and gas exploration and production. In order to improve oil, gas, and water exploration, drilling, and production operations, it is necessary to gather as much information as possible on the properties of the underground earth formations as well as the environment in which drilling takes place. Thus, well logging typically produce a large amount of information that needs to be analyzed to provide insights into the formation properties. The data to be analyzed are typically derived from logging operations using different instruments to probe various geophysical properties. Each of these instrument may generate an enormous amount of data, rendering the analysis difficult. In addition, it is often necessary to compare and contrast data from different measurements to gain insights into the formation properties.

For example, neutron tools are often used to provide information on formation porosity because formation liquids in pores interact with neutrons. However, because both water and hydrocarbons produce signals in neutron measurements, neutron logging data by themselves cannot reveal which pores contain water and which contain hydrocarbons. On the other hand, resistivity tools can easily differentiate whether a formation liquid is water or hydrocarbons, due to the high contrast in resistivity/conductivity in these two types of fluids. A combined use of these two measurements can provide information as to which formation pores contain hydrocarbons. In order to derive useful information from various formation logging data, it is a common practice to present each measurement data set in a strip chart graph ("track") and align various graphs side by side for analysis.

For example, FIG. 1 shows a typical prior art methods of presenting a a plurality of logging data as side-by-side tracks for analysis. The presentation shown in FIG. 1 is a standard format prescribed in, for example, Standard Practice 31A, published by the American Petroleum Institute, Washington, D.C. In this example, tracks 50, 54, 56 each include a header 57 which indicates the data type(s) for which a data curve or curves 51, 53, 55, 59 are presented in each track. Well log data are typically recorded with reference to the depth of well. A depth track 52, which shows the measured depth (MD, the depth from the top of the well) of the data, is typically included in the graph as shown in FIG. 1 to provide a representation of the well.

A presentation such as shown in FIG. 1 may include in the various curves 51, 53, 55, 59 "raw"data, such as detected voltages, detector counts, etc. actually recorded by well log instrument, or more commonly, a parameter of interest that is derived from the raw data, such as gamma density, neutron porosity, resistivity, acoustic travel time, etc.

The data tracks presented in a conventional graph (e.g., curves 51, 53, 55, 59 in tracks 50, 54, 56 of FIG. 1) do not lend themselves to intuitive interpretation by a user. In addition, linearization of a well may obscure valuable information that is dependent on the geometry of the well or the size of the borehole. In this conventional representation, the measurement data are dissociated from the physical structure of the wellbore. A more preferred method would be to display these data alongside the three-dimensional (3D) borehole trajectory. A borehole is typically of no more than a foot in diameter, but up to several miles long winding around in the subsurface formation. The thin and long 3D structure of the wellbore makes it difficult for a user to see the overall picture of the wellbore and at the same time to be able to see enough details in a selected section.

Therefore, it is desirable to have methods and systems that permit a user to manipulate a big 3D object easily and at the same time to be able to analyze a data associated with a particular section in details.

SUMMARY OF INVENTION

One aspect of the invention relates to methods for displaying multi-scale data alongside a three-dimensional object. A method for displaying a borehole trajectory in accordance with the invention includes displaying the borehole trajectory and an indicator of a working interval in a big view window; and displaying a section of the borehole trajectory in a small view window, wherein the section corresponds to the working interval.

Another aspect of the invention relates to systems for displaying multi-scale data alongside a three-dimensional object. A system for displaying a borehole trajectory in accordance with the invention includes a display; and a computer operatively coupled to the display, the computer having a program to display the borehole trajectory on the display, the program adapted to enable: displaying the borehole trajectory and an indicator of a working interval in a big view window; and displaying a section of the borehole trajectory in a small view window, wherein the section corresponds to the working interval.

Other aspects and advantages of the invention will be apparent from the following description and the appended claims.

DETAILED DESCRIPTION

Embodiments of the present invention relate to systems and methods for visualizing data alongside a 3D object on a computer display. The embodiments use multiple views, which display varying levels of detail, to visualize the data alongside the 3D object. The multiple views display the data in such a manner that a user can view simultaneously the "big picture" and all relevant details, always being aware of where the details fit in the big picture. For example, in some embodiments, the multiple views may be used to simultaneously display two or more of the following: data alongside an entire 3D object, data alongside a section of the 3D object, and/or measurements taken based on the data alongside the 3D object. In addition, in one or more embodiments, the multiple views may include one or more 3D and/or 2D canvases. For clarity, the following description assumes the 3D object is a wellbore. However, one of ordinary skill in the art would appreciate that embodiments of the present invention are not limited to displaying 3D and 2D representations of well log data together with a wellbore.

While observing a 3D well trajectory, a user may need to perform frequent translational, rotational, and zooming operations (user-requested operations) to assist in analysis of the corresponding data and/or measurements. In order to facilitate the user-requested operations, embodiments of the invention provide a navigation system that employs compass-based navigational techniques and includes a graph-based coordinate system. The navigation system in accordance with the invention allows the user to conveniently keep track of and/or change the orientation and location of the region of interest and to view the region with sufficient details. In addition, embodiments of the invention may control the level of detail shown in the 3D visualizations based on a distance between the user and the objects displayed.

Further, embodiments of the invention include a synchronization system that allows user-requested operations to be synced between some or all of the multiple views. In particular, while observing the 3D trajectory, the synchronization system ensures that the current point of interest (POI) remains visible in all synced views. For example, the 3D trajectory may be translated so that the POI is moved to a new location on the 3D trajectory in a first view. Then, the synchronization system ensures that the other views that are synced to the first view are updated to reflect the changes in the first view.

Figure 2:
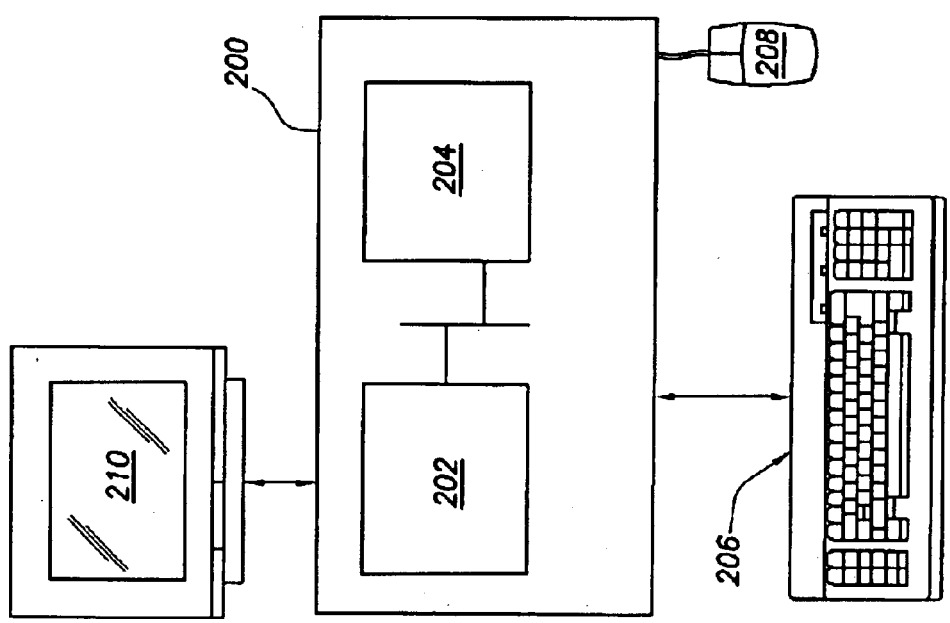
FIG. 2 shows a block diagram of a computer system.

The invention described here may be implemented on virtually any type of computer regardless of the platform used. For example, as shown in FIG. 2, a typical computer (200) has a processor (202), associated memory (204), and numerous other elements and functionalities typical to today"s computers (not shown). The computer (200) has associated therewith input means such as a keyboard (206) and a mouse (208), although in different embodiments these input means may take other forms. The computer (200) is also associated with an output device such as a display (210), which also may take a different form in different embodiments.

Three dimensional (3D) objects are commonly visualized on computer displays in two-dimensions (2D). Such computer displays allow users to view the 3D objects by rotating, translating, or zooming in and out of the displayed scenes. Typical 3D visualization software packages respond to the user-requested actions by moving the viewpoint (observer eyes or camera) around a 3D scene. For rotation and zooming operations, these are performed with respect to a pivot point, which is typically the point of interest (POI). The POI in a typical 3D visualization software package may be set at the center of the display by default or selected by a user through an input device (e.g., a mouse or a keyboard).

A borehole trajectory presents special problems in 3D visualization because a borehole may be several miles long and yet its diameter is no larger than a foot. For example, it is difficult using a typical 3D visualization software package to keep the trajectory within a view area during the zooming in and out operations, which are frequently required to visualize the entire borehole and to inspect detail information in a particular area. One approach to address this problem is disclosed in U.S. patent application Ser. No. 09/948,027, filed on Sep. 6, 2001 by Fleury. This application is assigned to the assignee of the present invention and is hereby incorporated by reference in its entirety.

The methods disclosed in the Fleury application use a reference shape to represent a 3D trajectory and to restrict the POI to travel along the reference shape. A reference shape, for example, may be a wire lying along the longitudinal axis of the borehole. Other reference shape may include a curvilinear object ("thin wire") lying slightly offset from the longitudinal axis, located on the wall of the well, or located some where outside, but near, the well. Furthermore, a reference shape may not necessarily be a "thin wire." For example, a 3D reference shape may be a cylinder (i.e., a "thick wire") or a cylindrical surface (i e., a pipe or tube) that follows the shape of the well trajectory. The radius of such a cylinder or a cylindrical surface may be smaller than, similar to, or slightly greater than that of the well trajectory.

Another unique problem associated with the analysis of a borehole arises from the necessity to display a plurality of measurement data at the same area of the borehole, preferably preserving the 3D relationship relative to the borehole. In addition, it is often desirable to be able to display only a selected group of measurement data at any time. Embodiments of the invention provide convenient methods for displaying a plurality of data (e.g., well log data) together with the 3D object (e.g., a borehole trajectory) with which the data are associated. The 3D object is displayed in a big view window to make the user aware of the point of interest with relation to the overall structure and at the same time allows the user to have a detailed view (small view) of the section of interest. In some embodiments of the invention, the various views (log view, big view, and small view) are displayed in a synchronized fashion such that when a user manipulates one displayed view, the other views are automatically updated.

Figure 3:
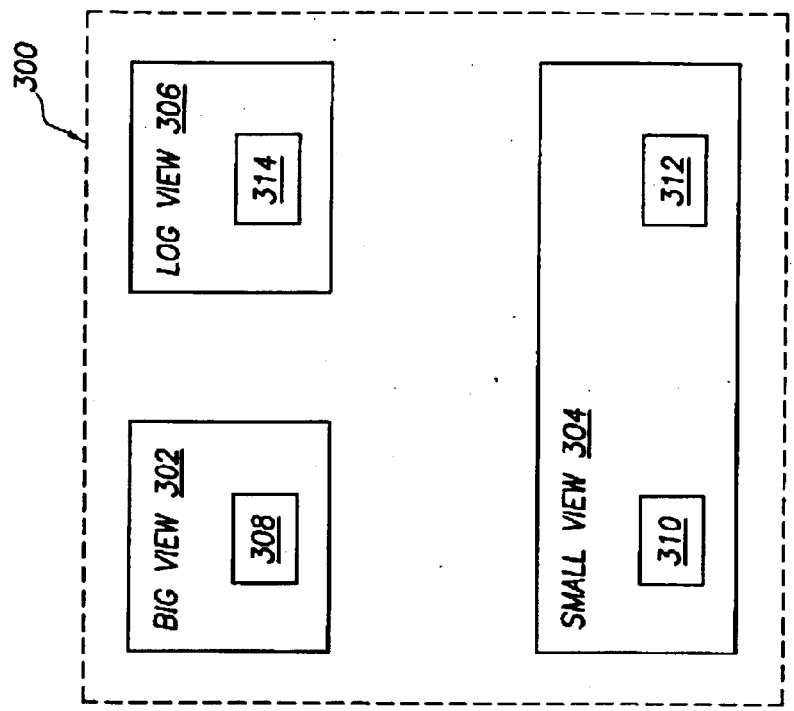
FIG. 3 shows a diagram illustrating a visualization system in accordance with an embodiment of the present invention.

FIG. 3 shows a block diagram of an exemplary system for visualizing data alongside a 3D trajectory. As shown in FIG. 3, a visualization system (300) in accordance with an embodiment of the present invention may include the following multiple views: a big view window (302) having a 3D canvas (308), a small view window (304) having a 3D canvas and a 2D canvas, and a log view (306) having a 2D canvas. The big view window (302) may be used to observe the 3D trajectory in large scale. In particular, the 3D canvas (308) of the big view window (302) may display data alongside an entire 3D trajectory, and, accordingly, may be used to view an entire borehole and data in Earth Coordinate.

The small view window (304) may be used to observe data alongside a section, referred to herein as a working interval, of the 3D trajectory. In the small view window (304), the 3D canvas (310) may display a working interval of the 3D trajectory, and, accordingly, may be used to view a small section of the borehole and data in a coordinate system relative to the borehole. In some embodiments, the relative coordinate system may be implemented as a more detailed scale of the Earth Coordinate used in the big view window (302). In the small view window (304), a 2D canvas (312) may also be included to display, for example, a cross-section view of the working interval shown in the 3D canvas (310). The cross-section view may represent an intersection of a plane orthogonal to the borehole with a surface of the borehole shown in the 3D canvas (310).

Figure 1:
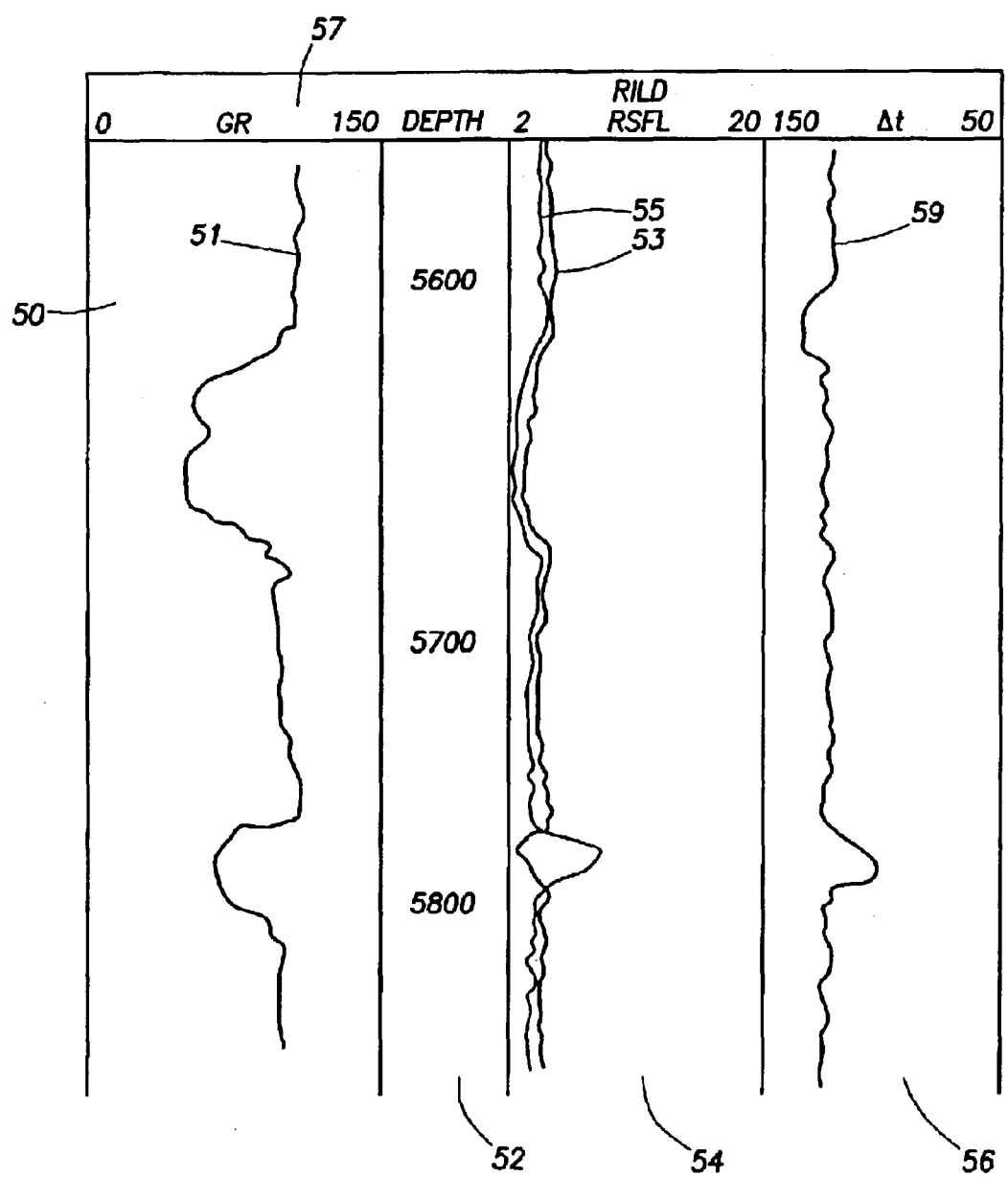
FIG. 1 shows a diagram illustrating a graphical representation of a well log data presentation.

In accordance with some embodiments of the invention, the log view (306) may be used to observe data and/or measurements taken along the 3D trajectory. The data and/or measurements may be displayed on a 2D canvas (314) of the log view (306) alongside an index. In some embodiments, the index may be a series of measured depths (MD, which are lengths of a borehole from the beginning of the trajectory) of a borehole as data labels relative to the borehole. The data or measurements displayed in the log view (306) may be presented in a conventional chart format as shown in FIG. 1.

Figure 4A:
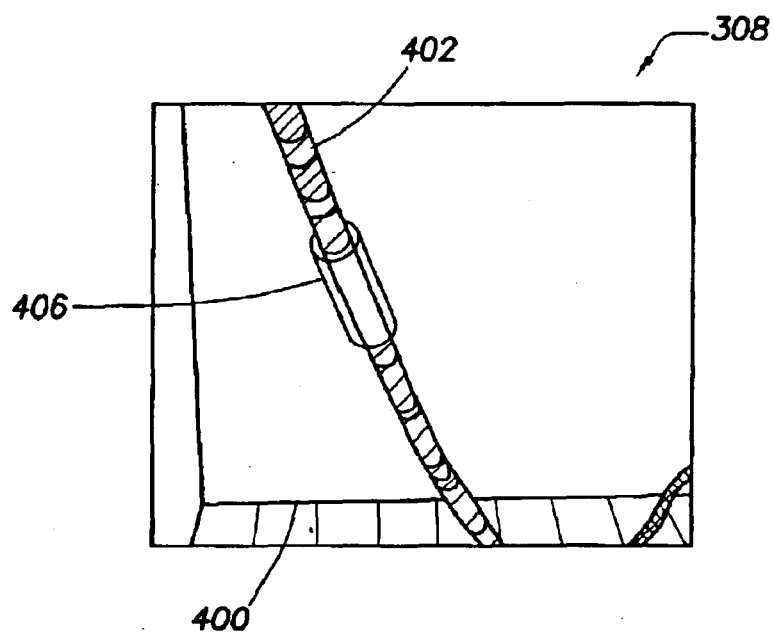
FIGS. 4a, 4b, and 4c show diagrams illustrating a big view in accordance with an embodiment of the present invention.
Figure 4B:
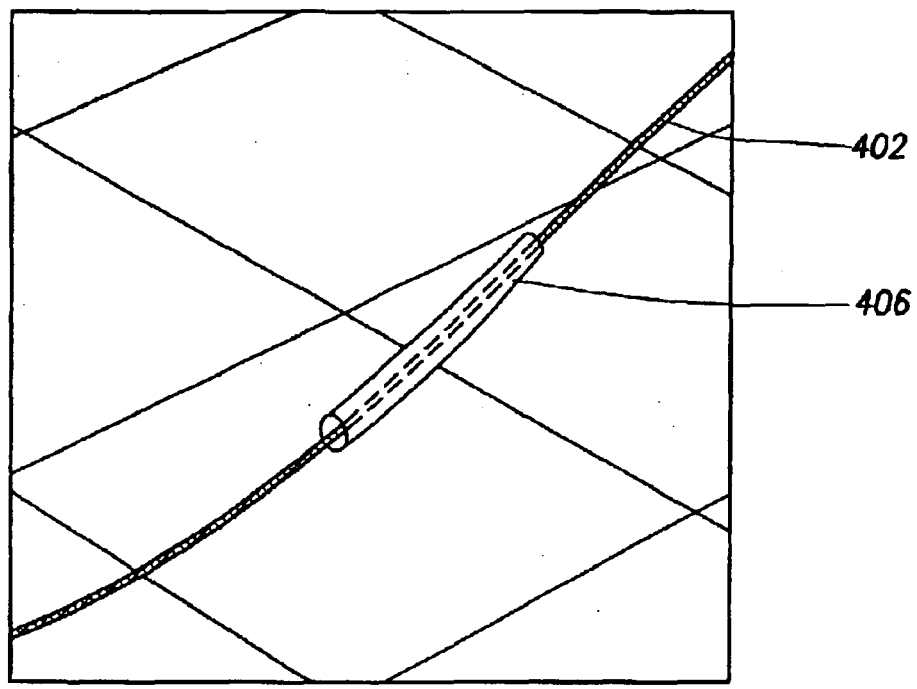
Figure 4C:
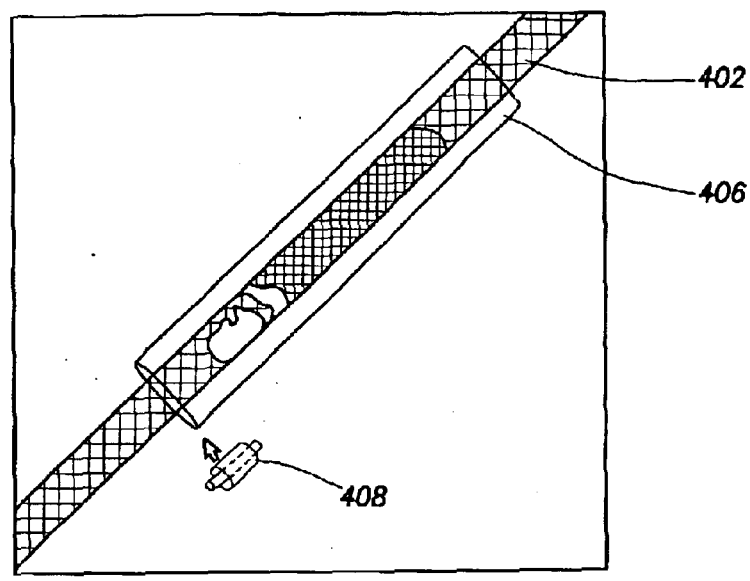

FIGS. 4a, 4b, and 4c show diagrams illustrating exemplary images of the 3D canvas (308) in the big view window (302). In FIG. 4a, the 3D canvas (308) displays a 3D trajectory of a borehole (402) relative to a grid (400). In the embodiment shown in FIG. 4a, the grid (400) is a 3D object having a scale in Earth Coordinate. The borehole (402) is displayed as a 3D surface (referred to herein as a caliper surface) reflecting variations in diameters in different sections of the borehole (402). The diameter variations may be derived from caliper measurements using a sonic or mechanical caliper tool. In some embodiments, the borehole (402) may be displayed as a surface having varying diameters that reflect measurement data rather than physical diameters of the borehole. For example the displayed diameters may reflect differing resistivities measured along the borehole. Furthermore, in some embodiments, the 3D borehole trajectory may be represented as simple 3D cylinders or cylindrical segments that have no relationship with actual diameters or measurement values of the borehole. In addition to the varying diameters, the displayed 3D surface may also include color schemes representing different values of measurement data for a formation property (e.g., resistivity, porosity, density, or lithology) along the 3D borehole trajectory.

In addition, the 3D canvas (308) may also depict a working interval which may be displayed, for example, as a semi-transparent cylinder (406) circumscribed around the 3D borehole trajectory. The working interval cylinder (406) corresponds to the section of the borehole trajectory shown in the small view window (304). In order not to saturate, or clutter, the image shown in the 3D canvas (308), the working interval cylinder (406) may be transparent or semi-transparent However, as shown in FIG. 4b, when the camera used to define the user"s point of view is zoomed out, the working interval cylinder (406) may become more opaque so that it will remain visible in the big view 3D canvas (308). If desired, the depiction of the working interval may also be "turned off" in the big view window (302) in order to remove the working interval cylinder (406) from the 3D canvas (308).

In some embodiments, the section of the borehole trajectory displayed in the small view window (304) is synced with the working interval cylinder (406) displayed in the big view window (302). Thus, the working interval in the small view window (304) may be reset from the big view window (302), and vice versa. For example, to reset the working interval, a user may use an input means, e.g., a mouse and/or a keyboard, to translate, or glide, the working interval along the borehole trajectory (402) in the big view window (302). As shown in FIG. 4c, when gliding the working interval cylinder (406) along the borehole trajectory (402), a cursor (408) may change to a different shape to depict the current user-requested operation (the resetting of the working interval).

Figure 5:
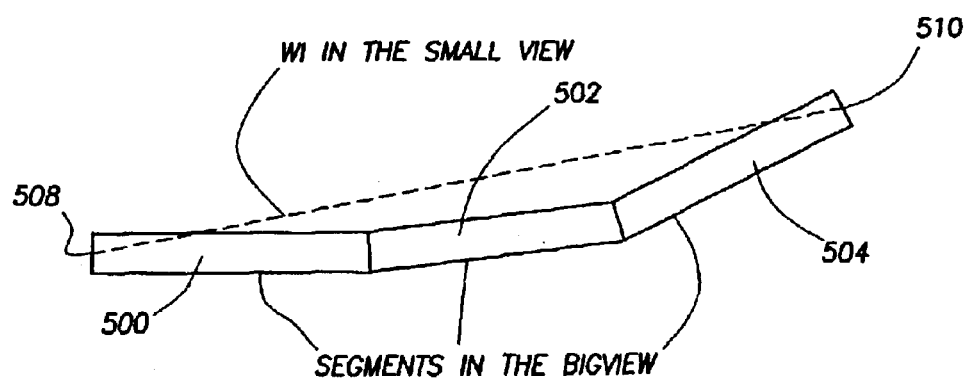
FIG. 5 shows a diagram illustrating a relationship between multiple views in accordance with an embodiment of the present invention.

FIG. 5 shows a diagram illustrating a relation between a working, interval and a borehole. As shown in FIG. 5, a borehole trajectory (402) may be represented in a number of borehole segments (500, 502, 504). When positioning a working interval (506) along the borehole (402), a beginning point (508) and an ending point (510) of the working interval respectively correspond to a start point of a first borehole segment (500) included in the working interval (506) and an end point of a last borehole segment (504) included in the working interval (506). Likewise, when observing the working interval (506) on the small view window"s 3D canvas (310 in FIG. 3), different borehole segments (500, 502, 504) may be viewed by scrolling up and down the working interval (506). In some embodiments, an image of the working interval (406) displayed on the 3D canvas may be scrolled up/down by one segment length when the working interval (406) is moved by the user.

Figure 6A:
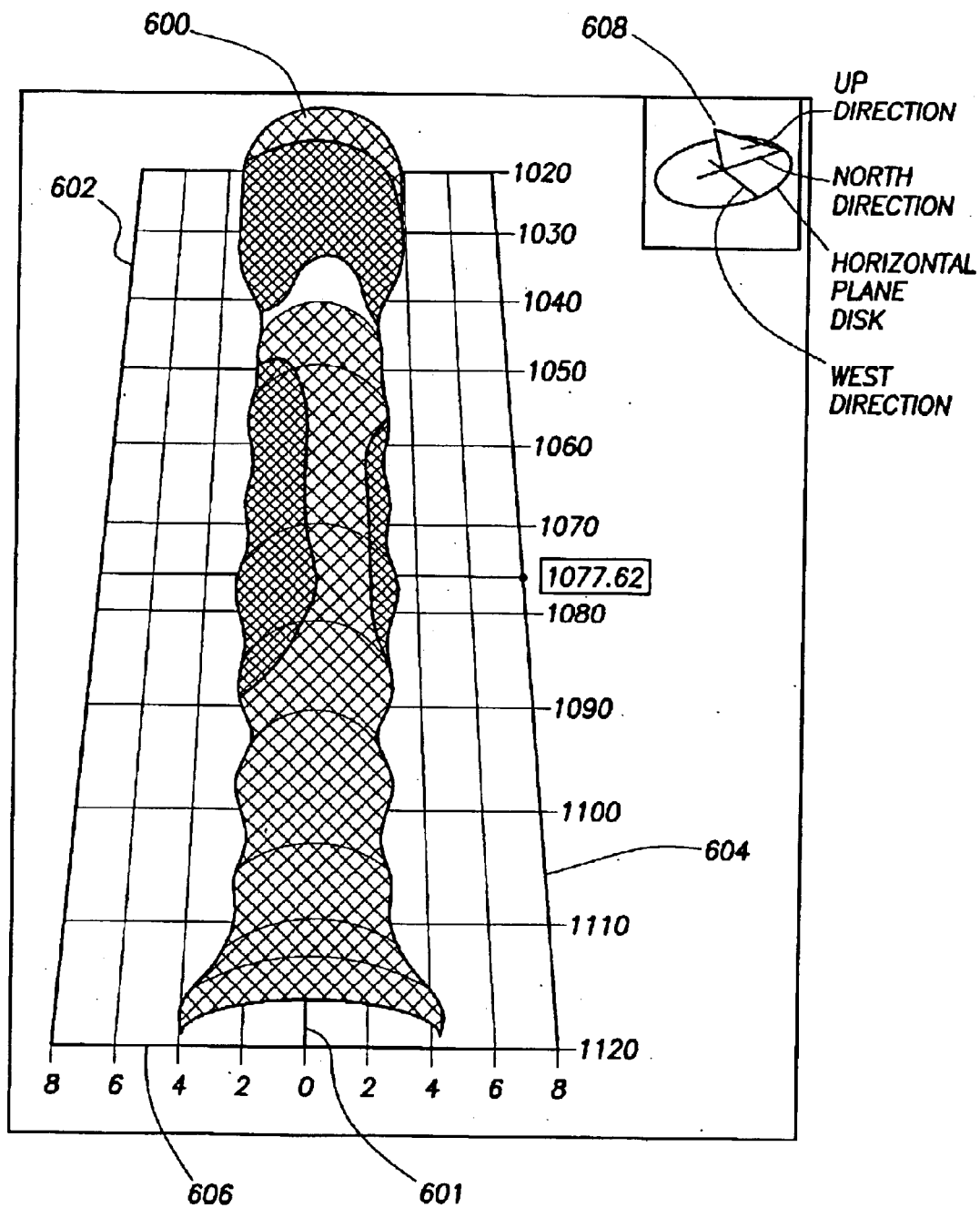
FIGS. 6a, 6b, and 6c show diagrams illustrating a canvas of a small view in accordance with an embodiment of the present invention.
Figure 6C:
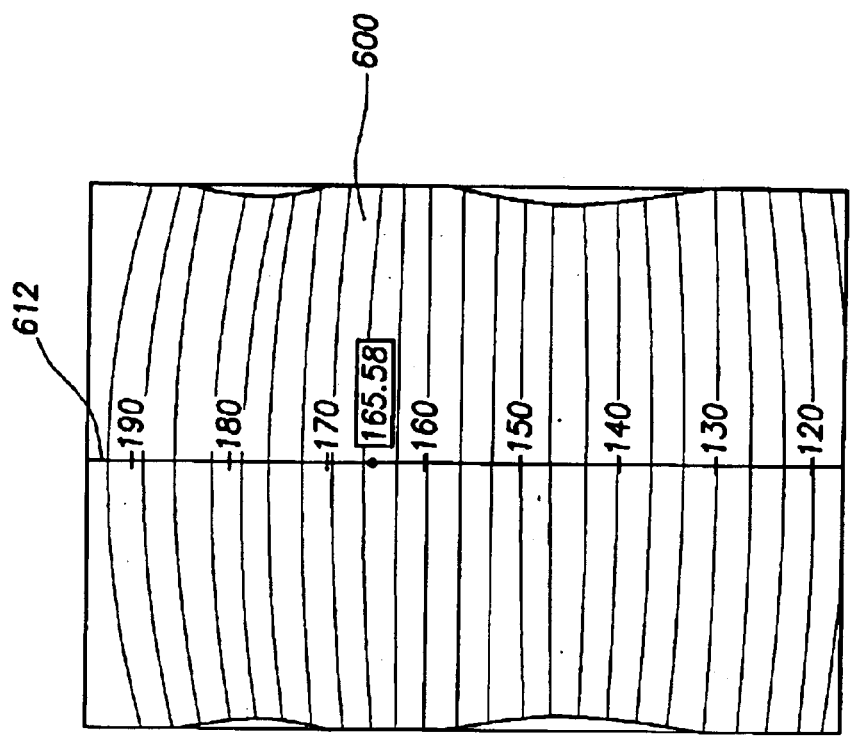
Figure 6B:
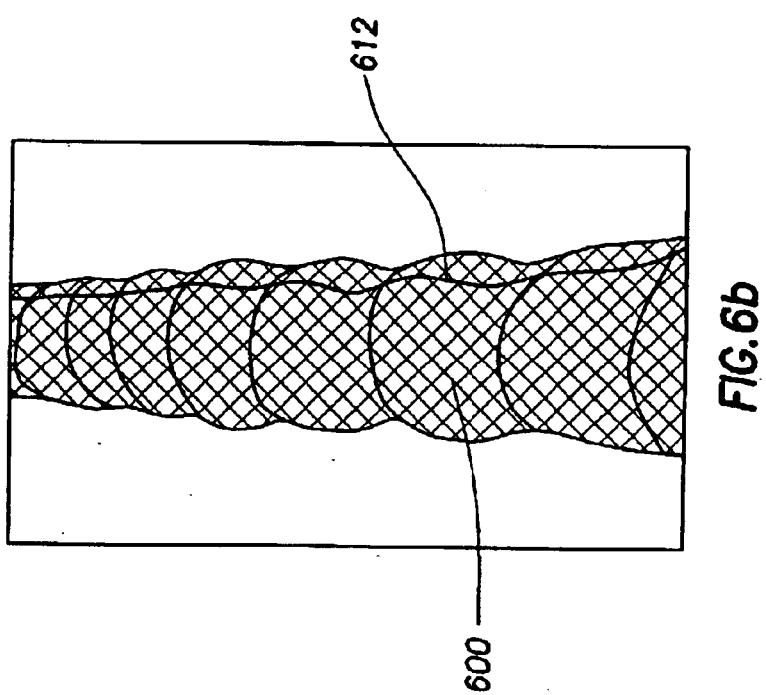
Figure 7A:
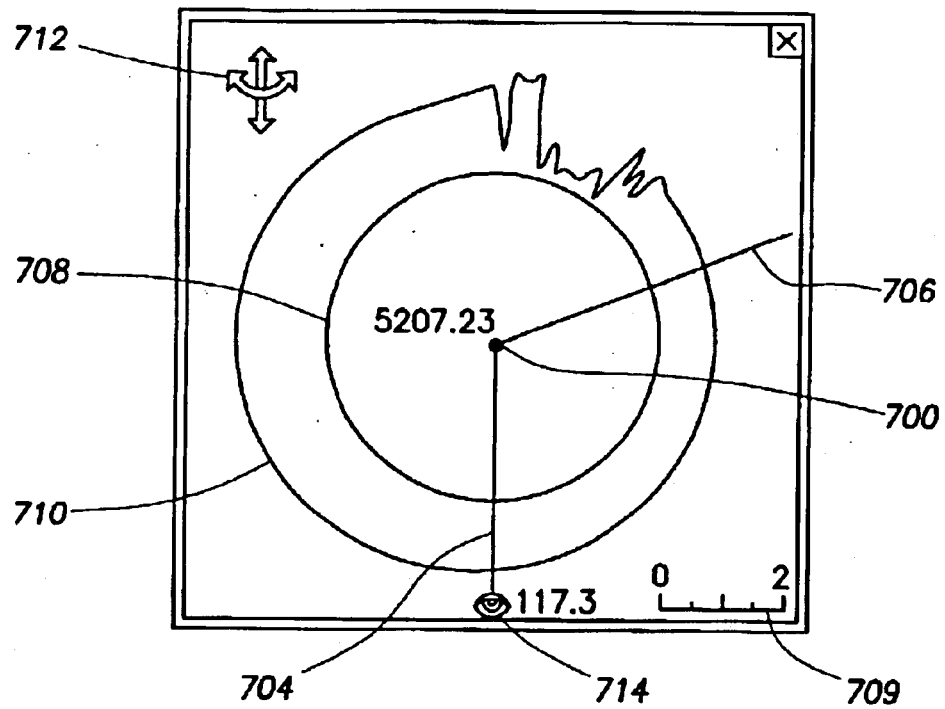
FIGS. 7a and 7b show diagrams illustrating a canvas of a small view in accordance with an embodiment of the present invention.
Figure 7B:
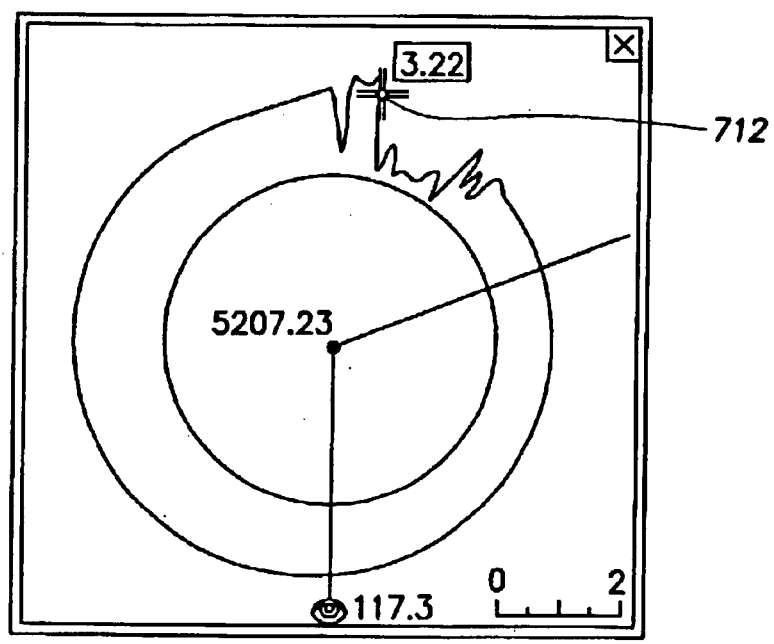

FIGS. 6a–6c and 7a–7b show diagrams illustrating exemplary images of the small view window (304 in FIG. 3). In particular, FIGS. 6a, 6b, and 6c show exemplary images of the small view window"s 3D canvas (310 in FIG. 3), and FIGS. 7a and 7b show exemplary images of the small view window"s 2D canvas (312 in FIG. 3). In FIG. 6a, the 3D canvas (310) displays a 3D trajectory of a borehole section (600) relative to a grid (602). As mentioned with respect to FIG. 4a, the borehole section (600) may be depicted as a caliper surface, the diameters of which correspond to diameters of the borehole determined by a caliper tool. In some embodiments, the diameters of the displayed borehole section (600) may reflect measured formation properties, e.g., resistivity. In this case, the larger diameter may represent higher resistivity and the smaller diameter may represent lower resistivity, or vice versa. In addition to the diameters, the surface of the displayed borehole section (600) may be used to display additional information using a color scheme, such as another formation property (e.g., porosity or density). Note that the displayed borehole section (600) may include one or more borehole segments depending on a size and zoom factor of the image displayed by the 3D canvas (310).

Referring to FIG. 6a, the grid (602) is a 2D object having a vertical ruler (604) and a horizontal ruler (606). In this example, the vertical scale (604) has a grid interval corresponding to measured depths (MDs) of the borehole section (600), and the horizontal ruler (606) has a grid interval corresponding to the diameter measurements of the borehole section (600). As shown the horizontal ruler (606) is displayed with 0 aligned with the reference line (601) that lies along the axis of the borehole. As noted above, the reference line (601) may be used to restrict the movement of the POI such that the borehole trajectory is always displayed within the viewing area. The MDs displayed on the vertical ruler (604) indicate an absolute depth measured from the top of the borehole (i.e., a top of the borehole at the Earth"s surface). As noted above, the diameters of the displayed section (600) may represent measurement data (e.g., resistivity) instead of physical diameters of the borehole. In this case, the horizontal ruler as shown would indicate the measurement values instead of borehole diameters.

Referring again to FIG. 6a, the 3D canvas (310) may selectively display a compass (608) in a corner of the viewing area to assist in navigation. The compass (608) indicates a spatial orientation of the borehole section (600). Specifically, the compass (608) includes directional labels (shown as "up direction", "north direction," and "west direction") positioned about a horizontal plane disk to help orient the borehole section (600) to the user. Also, as shown in FIG. 6b, a top-of-hole (TOH) intersection line (612) may be selectively displayed by the 3D canvas (310). The TOH line (612) indicates an intersection of the borehole section (600) with a vertical plane passing through the borehole axis. The TOH intersection line (612) may be drawn using a desired color. Similarly, the 3D canvas (310) may selectively display a north-south (NS) intersection line (not shown) that indicates an intersection of the borehole section (600) with a vertical plane parallel to the NS direction. The NS intersection line may be drawn using a desired color, which may be a color different from the color used for the TOH intersection line (612).

Note that according to some embodiments of the invention, the small view window (304) may support a vertical navigational mode and a big view navigational mode. In the vertical navigational mode, an axis of the borehole section (600) is always vertical. Accordingly, only around-axis rotations of the borehole section (600) are allowed. In the big view navigational mode, the axis of the borehole section (600) is not fixed. Accordingly, the user is allowed to rotate and/or translate the borehole section (600) in any manner desired. The vertical navigational mode helps a user to orient the borehole section (600) with respect to the entire borehole or the Earth Coordinate, for example, with the top oriented towards the top of the borehole. On the other hand, the big view navigational mode allows the user more freedom to manipulate the borehole section (600).

FIG. 6c illustrates an alternative way to display a ruler or grid with respect to the displayed 3D object. When a camera used to view the image on the 3D canvas (310) is zoomed in such that the diameter of the borehole section (600 in FIG. 6a) is substantial compared with the width of the 3D canvas (312), the horizontal and vertical rulers (606, 608 in FIG. 6a) of the grid (602) shown in FIG. 6a become ineffective. In order to provide scaling information to the user, a vertical ruler (612) having an interval relative to the vertical scale (608 in FIG. 6a) may be superimposed over the borehole section (600 in FIG. 6a).

Referring to FIGS. 7a and 7b, two images of the 2D canvas (312) are shown. In FIG. 7a, the 2D canvas (312) displays a cross-section view of the borehole section (600 in FIG. 6a) which may include all of the caliper surfaces (708, 710) created for the borehole section (600 in FIG. 6a). The cross-section view may be implemented as a top-down image of the borehole section (600 in FIG. 6a) which includes navigational and scaling labels and information. In the embodiment shown in FIG. 7a, these labels and information include a POI (700), a measurement depth (702) at the POI (700), a North-South intersection line (704), a TOH intersection line (706), and a scale (709). The scale (709) is chosen dynamically such that the most outlying caliper surface (708) is included in the viewable area of the 2D canvas (312). In addition, an icon (e.g., the eye icon) (714) may be included to indicate the angle between the TOH line (706) and the NS line (704).

The user may navigate the 2D canvas (312) in the vertical navigational mode (described above) by rotating the borehole section (600 in FIG. 6a) around its axis. As shown in FIG. 7a, when rotating the borehole section (600 in FIG. 6a), a cursor image (712) may change to depict the current user initiated operation (the rotating of the borehole section). Further, as shown in FIG. 7b, when the cursor is not being moved, the cursor image (712) may change to depict other information (e.g., the current MD of the cross section or a radius representing a current distance of the cursor from the borehole"s axis). One of ordinary skill in the art would appreciate that these are examples of the displays and other modifications are possible without departing from the scope of the invention. For example, the cursor display may be visible only during a user-requested operation.

Figure 8:
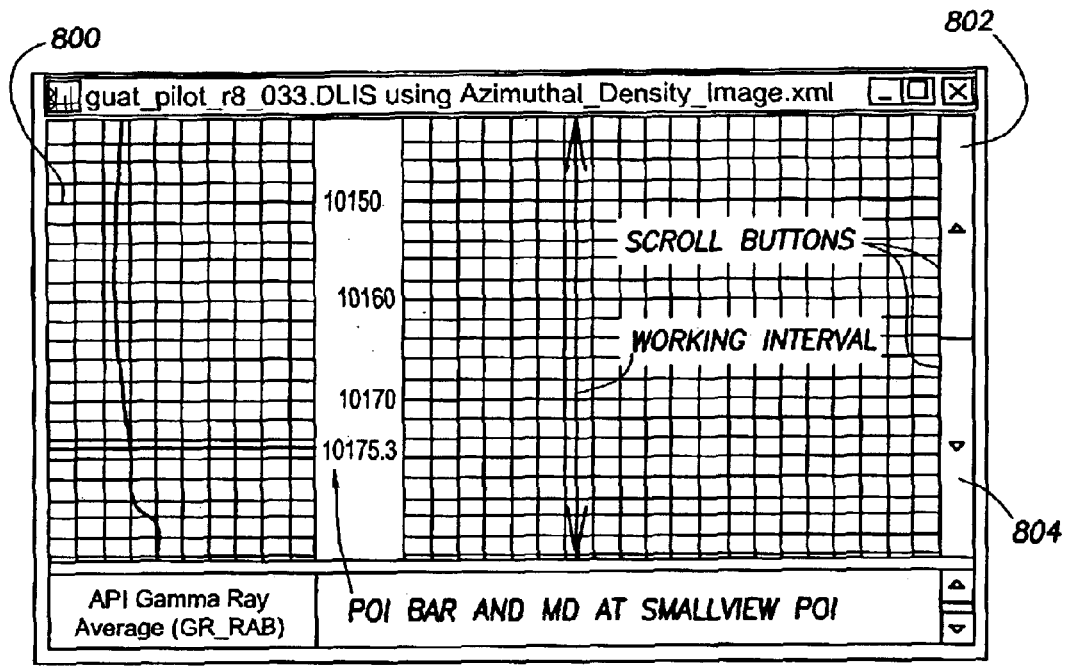
FIG. 8 shows a diagram illustrating a log view in accordance with an embodiment of the present invention.

FIG. 8 shows a diagram illustrating an exemplary image of the 2D canvas (314) in the log view (306 in FIG. 3). As mentioned above with respect to FIG. 3, the 2D canvas (314) may be used to display data and/or measurements taken along the borehole (402 in FIG. 5a). In the embodiment shown in FIG. 8, 2D canvas (314) shows an interval of the borehole (402 in FIG. 5a) equivalent to a working interval. Accordingly, the data and/or measurements shown in the 2D canvas (314) correspond to MDs of the working interval. For example, in FIG. 8, a section of a gamma ray average is displayed as a conventional track in the chart.

In addition, the 2D canvas (314) displays a cursor or POI bar (800) that indicates the current cursor or POI position on the trajectory. A value for the current cursor or the POI location may be displayed. The value may be the MD value corresponding to the POI location or a measurement value at the cursor location. The displaying of the measurement value may be in response to a user action, e.g., mouse clicking on the displayed object. The ability to display a measurement value (e.g., MD, resistivity, density, porosity, etc.) in response to a user action makes it possible for the user to inquire about formation properties with respect to the 3D trajectory. This provides a means to perform virtual core analysis at any location along the borehole. Note that in the user inquiry or virtual core analysis operation, the measurement value may be displayed in the log view window, the small view window, or the big view window.

In the log view window (306), the user may scroll up/down the working interval shown in the 2D canvas (314) using the scroll buttons (802, 804). In a preferred embodiment, the data displayed in the log window (306 in FIG. 3), may be synchronized with the borehole trajectory display in the small view window (304 in FIG. 3) and/or the big view window (302 in FIG. 3). In the synchronized mode, any manipulation in the log window (e.g., scrolling up and down) may also update the corresponding displays in the small view window and/or the big view window.

Figure 9:
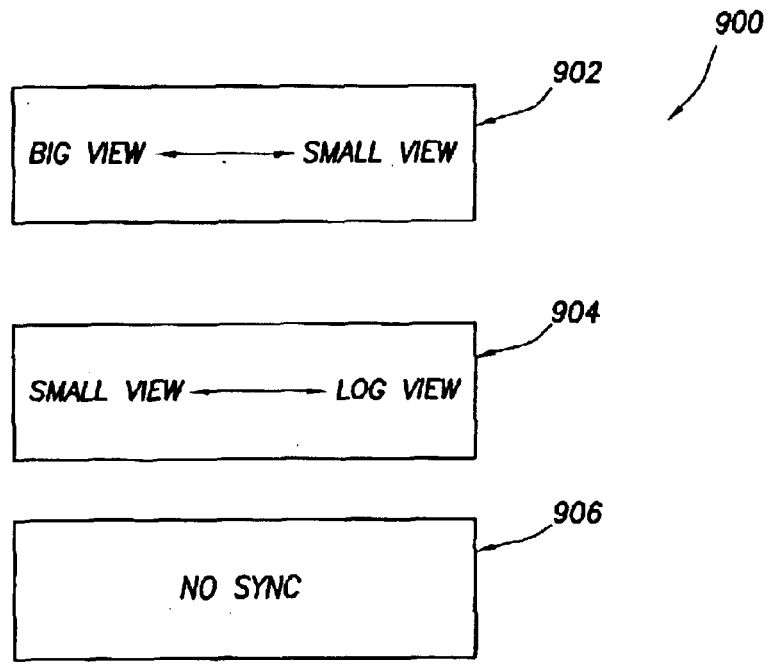
FIG. 9 shows a diagram illustrating a synchronization system in accordance with an embodiment of the present invention.

FIG. 9 shows a diagram illustrating an exemplary synchronization system in accordance with an embodiment of the present invention. As shown in FIG. 9, the synchronization system (900) in accordance with the invention, for example, may support the following synchronization modes: a big view-to-small view (BS) sync mode (902), a small view-to-log view (SL) sync mode (904), and a no sync mode (906). Note that the BS sync mode (902) and the SL sync mode (904) may either be used separately or together. When used together, they provide a synchronization between the big view-to-log view sync mode. In an alternative embodiment, the big view-to-log view sync mode (not shown) may be directly implemented without linking through the small view window.

In the BS sync mode (902), changes made to a working interval in either the big view (302 in FIG. 3) or the small view (304 in FIG. 3) window affect both the big view window (302 in FIG. 3) and the small view window (304 in FIG. 3). For example, when a user selects or changes a working interval in the big view window (302 in FIG. 3), the working interval is updated in the big view window (302 in FIG. 3) and a section of the borehole trajectory displayed in the small view window (304 in FIG. 3) is updated to match the working interval selected in the big view window (302 in FIG. 3). Similarly, a change in the working interval in the small view window may also cause the corresponding working interval cylinder (406 in FIG. 4) to be updated in the big view window. In some embodiments, navigation within the big view window (302 in FIG. 3) and the small view window (304 in FIG. 3) may be synchronized. For example, if a user rotates the borehole trajectory in the small view window (304 in FIG. 34), the corresponding display in the big view window (302 in FIG. 3) may be concomitantly updated to match the view shown in the small view window (304 in FIG. 3).

In the SL sync mode (904), the displayed elements (e.g., measured depth (MD) intervals and a POI) in the small view window (304 in FIG. 3) are synchronized with the corresponding elements in the log view (306 in FIG. 3). Accordingly, changes made to the display in the small view window (304 in FIG. 3) update the display in the log view (306), and vice versa. In some embodiments of the invention, the BS sync mode (902) and the SL sync mode (904) are used together. In this case, changes made to the displayed element (e.g., working interval) in any of the three views (302, 304, 306 in FIG. 3) affect the corresponding elements shown in the other two views (302, 304, 306 in FIG. 3).

In the no sync mode (906), none of the multiple views (302, 304, 306 in FIG. 3) are synced with one another. Accordingly, changes made to any of the three views (302, 304, 306 in FIG. 3) do not affect the other two views (302, 304, 306 in FIG. 3).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for displaying on a computer graphical user interface a borehole trajectory, comprising:
   displaying the borehole trajectory and an indicator of a working interval in a first window; and
   displaying a section of the borehole trajectory in a second window, wherein the section corresponds to the working interval, and wherein the first window and the second window are displayed concurrently within the same graphical user interface.

2. The method of claim 1, wherein the displaying the indicator in the first window is sychronized with the displaying the section in the second window, such that a change made to a display in the first window is reflected in a display of the second window or such that a change made to a display in the second window is reflected in a display of the first window.

3. The method of claim 1, further comprising displaying well log data in a third window.

4. The method of claim 3, wherein the log data displayed in the third window correspond to the section displayed in the second window.

5. The method of claim 3, wherein the displaying the section in the second window and the displaying the data in the third window are synchronized.

6. The method of claim 1, further comprising displaying a line on a surface of the borehole trajectory, the line indicating a top-of-hole.

7. The method of claim 1, wherein the displayed borehole trajectory has diameters related to borehole diameters or a formation property determined along the borehole trajectory.

8. The method of claim 1, further comprising displaying a measurement value in response to a user action.

9. The method of claim 8, wherein the measurement value represents a formation property determined along the borehole trajectory.

10. The method of claim 1, further comprising displaying a graphical representation of data associated with the borehole trajectory on a surface of the borehole trajectory.

11. The method of claim 1, further comprising displaying a compass in the second window, the compass provides directional information.

12. The method of claim 1, further comprising displaying a cross section of the section of the borehole trajectory in the second window.

13. The method of claim 1, further comprising displaying a grid in the second window.

14. The method of claim 13, wherein the grid includes information related to a physical dimension of the borehole trajectory or a formation property determined along the borehole trajectory.

15. The method of claim 1, wherein the section displayed in the second window is in a vertical orientation such that a top of the section aligns with a beginning of the borehole trajectory.

16. A system for displaying a borehole trajectory in a computer graphical user interface, comprising:
    a display; and
    a computer operatively coupled to the display, the computer having a program to display the borehole trajectory on the display, the program comprising instructions to enable:
    displaying the borehole trajectory and an indicator of a working interval in a first window; and
    displaying a section of the borehole trajectory in a second window, wherein the section corresponds to the working interval, and wherein the first window and the second window are displayed concurrently within the same graphical user interface.

17. The system of claim 16, wherein the displaying the indicator in the first window is synchronized with the displaying the section in the second window, such that a change made to a display in the first window is reflected in a display of the second window or such that a change made to a display in the second window is reflected in a display of the first window.

18. The system of claim 16, wherein the program further comprising an instruction to enable displaying well log data in a third window.

19. The system of claim 18, wherein the log data displayed in the third window correspond to the section displayed in the second window.

20. The system of claim 18, wherein the displaying the section in the second window and the displaying the data in the third window are synchronized.

21. The system of claim 16, further comprising displaying a line on a surface of the borehole trajectory, the line indicating a top-of-hole.

22. The system of claim 16, wherein the displayed borehole trajectory has diameters related to borehole diameters or a formation property determined along the borehole trajectory.

23. The system of claim 16, wherein the program further comprising an instruction to enable displaying a measurement value in response to a user action.

24. The system of claim 23, wherein the measurement value represents a formation property determined along the borehole trajectory.

25. The system of claim 16, wherein the program further comprising an instruction to enable displaying a graphical representation of data associated with the borehole trajectory on a surface of the borehole trajectory.

26. The system of claim 16, wherein the program further comprising an instruction to enable displaying a compass in the second window, the compass provides directional information.

27. The system of claim 16, wherein the program further comprising an instruction to enable displaying a cross section of the section of the borehole trajectory in the second window.

28. The system of claim 16, wherein the program further comprising an instruction to enable displaying a grid in the second window.

29. The system of claim 28, wherein the grid includes information related to a physical dimension of the borehole trajectory or a formation property determined along the borehole trajectory.

30. The system of claim 16, wherein the section displayed in the second window is in a vertical orientation such that a top of the section aligns with a beginning of the borehole trajectory.

31. A method for displaying on a graphical user interface_a borehole trajectory, comprising:

displaying well log data associated with the borehole trajectory and an indicator of a working interval in a first window; and displaying a section of the borehole trajectory in a second window, wherein the section corresponds to the working interval, and wherein the first window and the second window are displayed concurrently within the same graphical user interface.

32. The method of claim 31, wherein the displaying the indicator in the first window is synchronized with the displaying the section in the second window, such that a change made to a display in the first window is reflected in a display of the second window or such that a change made to a display in the second window is reflected in a display of the first window.

* * * * *